US012436506B2

(12) United States Patent
Tortora

(10) Patent No.: US 12,436,506 B2
(45) Date of Patent: Oct. 7, 2025

(54) WATCH WITH SLIDING DISPLAY

(71) Applicant: The Swatch Group Research and Development Ltd, Marin (CH)

(72) Inventor: Pierpasquale Tortora, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 305 days.

(21) Appl. No.: 18/029,257

(22) PCT Filed: Nov. 4, 2021

(86) PCT No.: PCT/EP2021/080591
§ 371 (c)(1),
(2) Date: Mar. 29, 2023

(87) PCT Pub. No.: WO2022/096550
PCT Pub. Date: May 12, 2022

(65) Prior Publication Data

US 2023/0375984 A1 Nov. 23, 2023

(30) Foreign Application Priority Data

Nov. 5, 2020 (EP) .................................... 20205990

(51) Int. Cl.
*G04G 17/04* (2006.01)
*A44C 5/00* (2006.01)
*G04G 17/06* (2006.01)

(52) U.S. Cl.
CPC ......... *G04G 17/045* (2013.01); *A44C 5/0015* (2013.01); *G04G 17/06* (2013.01)

(58) Field of Classification Search
CPC .... G04G 17/045; G04G 17/06; A44C 5/0015; A44C 5/14; G06F 1/163
See application file for complete search history.

(56) References Cited

U.S. PATENT DOCUMENTS 7,618,260 B2 * 11/2009 Daniel ................. A44C 5/0007 439/528
9,904,254 B1 * 2/2018 Hariri .................. G04G 9/0064
2013/0074543 A1 3/2013 Vahid

FOREIGN PATENT DOCUMENTS

CN 108835778 A 11/2018
CN 110037399 A 7/2019
(Continued)

OTHER PUBLICATIONS

International Search Report for PCT/EP2021/080591, dated Jan. 20, 2022.

*Primary Examiner* — Edwin A. Leon
(74) *Attorney, Agent, or Firm* — Sughrue Mion, PLLC

(57) ABSTRACT

A watch includes a smart wristband and at least a smart screen arranged to be moved and disposed in a given location along the smart wristband. The smart wristband includes a wristband, a guide included in the wristband and extending along a length of the wristband, the guide being configured to guide processed data along the wristband to the smart screen, and a processing unit configured to transmit, via a second communication interface and the guide for transmission, the processed data to a first communication interface. The first communication interface includes a receiver of said smart screen. The receiver is configured to receive the processed data, and the guide is configured to ensure continuous transmission of the processed data by electromagnetic wave, acoustic wave, by electrical signals and/or by optical signals up to the receiver of the smart screen disposed at a given location along the wristband.

6 Claims, 1 Drawing Sheet

(56) References Cited

FOREIGN PATENT DOCUMENTS

| | | | |
|---|---|---|---|
| EP | 2 733 598 | A2 | 5/2014 |
| JP | 2014-102838 | A | 6/2014 |
| JP | 2018-513716 | A | 5/2018 |
| WO | 2005/083546 | A1 | 9/2005 |
| WO | 2014/130946 | A2 | 8/2014 |
| WO | 2016/124599 | A1 | 8/2016 |
| WO | 2016/146652 | A1 | 9/2016 |
| WO | 2017/156633 | A1 | 9/2017 |

* cited by examiner

WATCH WITH SLIDING DISPLAY

CROSS REFERENCE TO RELATED APPLICATIONS

This application is a National Stage of International Application No. PCT/EP2021/080591 filed Nov. 4, 2021, claiming priority based on European Patent Application No. 20205990.3 filed Nov. 5, 2020.

FIELD OF THE INVENTION

The present invention concerns the field of watches with a sliding display and more particularly that of smart screens and smart wristbands.

BACKGROUND OF THE INVENTION

Watches generally comprise a wristband or strap connected to a case middle containing an electronic movement. However, on the one hand, these case middles can bother the watch user depending on his or her body shape and, on the other hand, when worn, the electronic movement, displaying the time for example, is generally between the radius and the ulna.

In this position, the user cannot see the display and has to twist his or her forearm in order to view the display. This twisting motion may be particularly painful when the user has a painful shoulder or elbow for example.

Unfortunately, either because of the clasp or because of the size of the electronic movement, the watch can only be placed on the upper or lower part of the forearm, and it is thus impossible to move the electronic movement into an intermediate position to make it easier to see.

SUMMARY OF THE INVENTION

The present invention proposes to overcome all or part of the drawbacks by means of a smart screen configured to cooperate with at least one smart wristband; said smart screen being configured to be arranged on and/or to move along said at least one smart wristband and comprising at least one display, at least:

- one receiver, said at least one receiver being configured to receive processed data, and
- one control unit, said at least one control unit being configured to control said display as a function of said processed data.

As a result of this arrangement, said smart screen can cooperate with said at least one smart wristband by moving along said at least one smart wristband while displaying said processed data.

According to one embodiment, said smart screen comprises at least one sliding member configured to slide along said at least one smart wristband.

According to one embodiment, said smart screen comprises at least one runner member configured to run along said at least one smart wristband.

According to one embodiment, said smart screen comprises at least one bearing configured to run and/or slide along said at least one smart wristband.

As a result of one or other of the above arrangements, said smart screen can slide and/or run along said at least one smart wristband.

According to one embodiment, said smart screen comprises at least a first communication interface configured to cooperate with at least a second communication interface and to transfer said processed data to said at least one receiver.

As a result of this arrangement, said processed data can be transferred between said smart screen and said at least one smart wristband, preferably said processed data can be transferred between said at least a first communication interface and said at least a second communication interface.

According to one embodiment, said at least one receiver comprises at least one radio frequency receiver, at least one ultrasonic receiver, at least one induction receiver, at least one electrical receiver and/or at least one optical receiver.

As a result of this arrangement, said at least one receiver receives said processed data either by radio frequency signals, or by ultrasonic signals, or by induction signals, or by current signals, or by voltage signals and/or by light signals.

The present invention proposes to overcome all or part of the drawbacks by means of a precious or synthetic jewel and/or fine jewellery item comprising at least one smart screen according to an embodiment of the invention.

The present invention proposes to overcome all or part of the drawbacks by means of a smart wristband configured to cooperate with at least one smart screen according to an embodiment of the invention or precious or synthetic jewel and/or fine jewellery item according to an embodiment of the invention, said smart wristband comprising at least one wristband and at least:

- one processing unit, said at least one processing unit being configured to process data and to supply processed data, and
- one transmitter, said at least one transmitter being configured to transmit said processed data.

As a result of this arrangement, said smart wristband can cooperate with said at least one smart screen when said at least one smart screen moves along said at least one smart wristband and while supplying said processed data.

According to one embodiment, said smart wristband comprises at least one guide and at least a second communication interface, said at least one guide being configured to guide said processed data along said at least one wristband at least to said at least one smart screen and/or to said at least one precious or synthetic jewel and/or fine jewellery item via said at least a second communication interface, preferably to at least a first communication interface.

According to one embodiment, said at least one guide is configured to guide said processed data along said at least one wristband at least to said at least one smart screen; said processed data being transferred from said at least a second communication interface and at least one smart screen preferably via at least a first communication interface.

As a result of one or other of the above arrangements, said processed data can be transferred between said smart screen and said at least one smart wristband, preferably said processed data can be transferred between said at least a second communication interface and said at least a first communication interface.

According to one embodiment, said at least one wristband comprises said at least one guide, preferably said at least one wristband incorporates said at least one guide.

As a result of this arrangement, said at least one guide is not visible.

According to one embodiment, said at least a second communication interface is configured to be in contact with at least a first communication interface and/or with at least one smart screen and/or with at least one precious or synthetic jewel and/or fine jewellery item.

As a result of this arrangement, said processed data can be transferred between said at least a second communication interface and said at least a first communication interface.

According to one embodiment, said at least a second communication interface comprises at least one electrical contact interface, at least one transparent interface and/or at least one translucent interface.

According to one embodiment, said at least one guide comprises at least one electromagnetic waveguide, at least one acoustic waveguide, at least one electrical conductor and/or at least one optical fibre.

According to one embodiment, said at least one transmitter comprises at least one radio frequency transmitter, at least one ultrasonic transmitter, at least one induction transmitter, at least one electrical transmitter and/or at least one optical transmitter.

As a result of one or other of the above arrangements, said processed data can be guided to said at least one smart screen by electromagnetic wave, acoustic wave, by electrical signals and/or by optical signals.

The present invention proposes to overcome all or part of the drawbacks by means of a watch, watch kit, piece of jewellery or jewellery kit comprising at least one smart wristband according to an embodiment of the invention, and at least one smart screen according to an embodiment of the invention and/or precious or synthetic jewel and/or fine jewellery item according to an embodiment of the invention, said at least one smart screen being configured to be arranged on and/or to move along said at least one smart wristband and/or said precious or synthetic jewel and/or fine jewellery item being configured to be arranged on and/or to move along said at least one smart wristband.

As a result of this arrangement, it is possible to arrange at least one smart screen with at least one smart wristband in order to form a wristwatch.

The present invention proposes to overcome all or part of the drawbacks by means of a communication method for a watch kit according to an embodiment of the invention or between an assembly of at least one smart wristband comprising at least one smart wristband according to an embodiment of the invention, an assembly comprising at least one smart screen according to an embodiment of the invention, and/or an assembly comprising at least one precious or synthetic jewel and/or fine jewellery item according to an embodiment of the invention, said communication method comprising at least:

- Indicating the number of said at least one smart wristband of said assembly of at least one smart wristband, of said at least one smart screen of said assembly of at least one smart screen; and
- Distributing said data to be processed and/or said processed data between said assembly of at least one smart wristband, said assembly of at least one smart screen and/or said assembly of at least one precious or synthetic jewel and/or fine jewellery item.

As a result of this arrangement, it is possible to arrange at least one smart screen with at least one smart wristband in order to form a wristwatch and to distribute said data to be processed between said at least one smart wristband and/or said processed data between said at least one smart screen.

The present invention proposes to overcome all or part of the drawbacks by means of a processed data group transferred between at least one smart wristband according to an embodiment of the invention, at least one smart screen according to an embodiment of the invention and/or at least one precious or synthetic jewel and/or fine jewellery item according to an embodiment of the invention comprising at least one address and at least one processed data item.

As a result of this arrangement, said at least one smart wristband can communicate with at least one smart screen.

BRIEF DESCRIPTION OF THE DRAWINGS

The invention will be described in more detail below with reference to the annexed drawings, given by way of non-limiting example, in which.

DETAILED DESCRIPTION OF THE INVENTION

Figure 1:
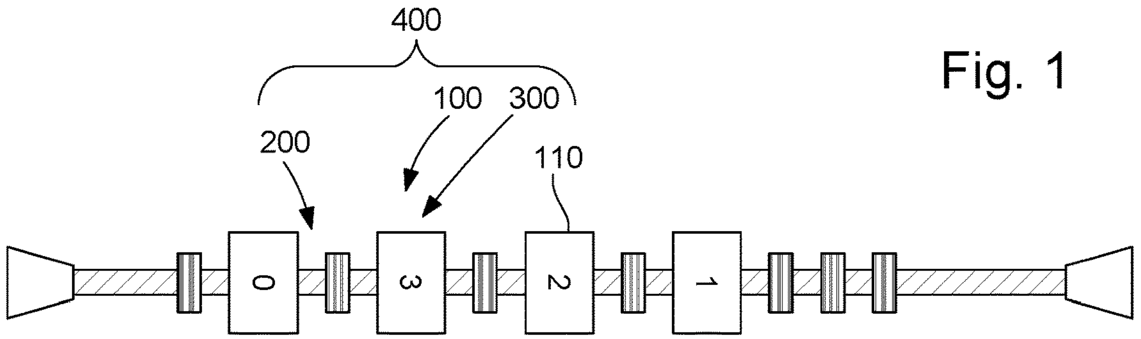
FIG. 1 illustrates a watch or watch kit comprising at least one smart wristband 200 according to an embodiment of the invention, and at least one smart screen 100 according to an embodiment of the invention.

As shown in FIG. 1, the present invention can take the form of a watch 400 or a watch kit 400, a piece of jewellery 400 or a jewellery kit 400 comprising at least one smart wristband 200, at least one smart screen 100, and/or precious or synthetic jewel and/or fine jewellery item 300. The rest of the detailed description of the invention will essentially be based on said watch 400 or said watch kit 400 and said at least one smart screen 100 for reasons of legibility. However, those skilled in the art know that this description applies mutatis mutandis to a jewel watch 400, to a jewel watch kit 400, to said piece of jewellery 400 or to said jewellery kit 400 comprising at least one smart wristband 200 and at least one precious or synthetic jewel and/or fine jewellery item 300 according to an embodiment of the invention presented below.

Said at least one smart screen 100 can be arranged on said at least one smart wristband 200 and the user can move said at least one smart screen 100 along said at least one smart wristband 200 in order to arrange said at least one smart screen 100 in a comfortable position on said at least one smart wristband 200.

Furthermore, it is entirely possible to envisage, for example, arranging decorative objects before and/or after said at least one smart screen 100 as shown in FIG. 1.

As mentioned, said at least one smart screen 100 can cooperate with said at least one smart wristband 200. This cooperation is shown schematically in FIG. 2 and shows a cross-sectional view of said at least one smart screen 100.

Figure 2:
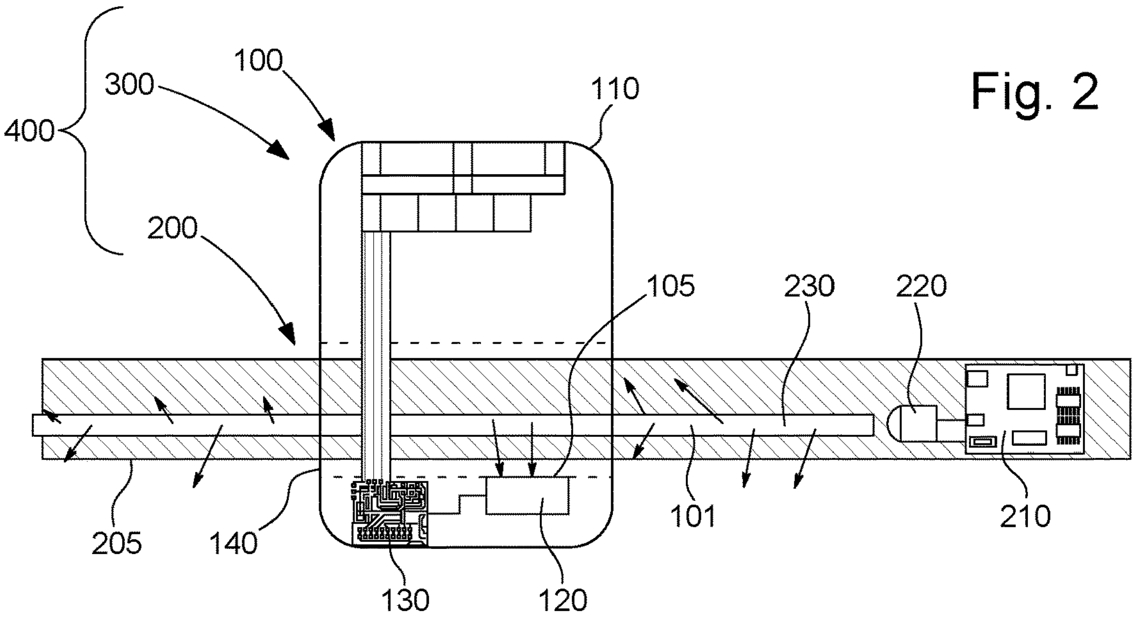
FIG. 2 represents said smart wristband 200 cooperating with said at least one smart screen 100 when said at least one smart screen 100 moves along said at least one smart wristband 200 while supplying said processed data 101.
Figure 3:
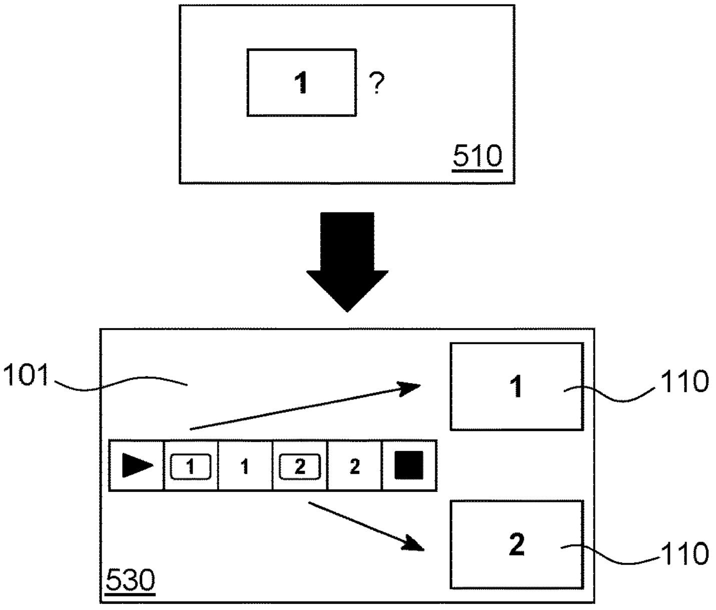
FIG. 3 represents a communication method 500 according to an embodiment of the invention.

As seen in FIG. 2, said at least one smart wristband 200 comprises at least one wristband 202, at least one processing unit 210 configured to process data 201 and to supply processed data 101 and at least one transmitter 220 configured to transmit said processed data 101. Said at least one transmitter 220, mentioned above, can take the form of at least one radio frequency transmitter 220, at least one ultrasonic transmitter 220, at least one induction transmitter 220, at least one electrical transmitter 220 and/or at least one optical transmitter 220, so that said processed data 101 can be guided to said at least one smart screen 100 by electromagnetic wave, acoustic wave, electrical signals and/or by optical signals.

To allow such guidance, said at least one wristband 202 comprises at least a second communication interface 205 and at least one guide 230, able to be integrated or concealed in said at least one wristband 202, possibly made of synthetic and/or natural material in order to facilitate cooperation with said at least one smart screen 100, and to guide said processed data 101 along said at least one wristband 202 at least to said at least one smart screen 100 via said at least a second communication interface 205, preferably to at least a first communication interface 105.

According to the embodiments, said at least a second communication interface 205 can comprise at least one electrical contact interface, at least one transparent interface and/or at least one translucent interface, and said at least one guide 230 can guide said processed data 101 via at least one electromagnetic waveguide 230, at least one acoustic waveguide 230, at least one electrical conductor 230 and/or at least one optical fibre 230 in order to communicate said processed data 101 to said at least one smart screen 100 by electromagnetic wave, acoustic wave, electrical signals and/or by optical signals, via said at least a first communication interface 105.

This latter, i.e. said at least a first communication interface 105 is comprised in said at least one smart screen 100 and can cooperate with said at least a second communication interface 205 to transfer said processed data 101 to said at least one receiver 120, for example. Thus, said processed data 101 can be transferred between said at least one smart screen 100 and said at least one smart wristband 200, preferably said processed data 101 can be transferred between said at least a first communication interface 105 and said at least a second communication interface 205.

Indeed, said at least one guide 230 can guide said processed data 101 along said at least one wristband 202 at least to said at least one smart screen 100, more specifically, said processed data 101 being transferred from said at least a second communication interface 205 and at least one smart screen 100 preferably via at least a first communication interface 105. Indeed, said at least a second communication interface 205 can be in contact with said at least a first communication interface 105 and/or with said at least one smart screen 100, as represented in FIG. 2, such that said processed data 101 can be transferred between said at least a second communication interface 205 and said at least a first communication interface 105.

Said at least one smart screen 100, comprises at least one display 110, at least one receiver 120 configured to receive processed data 101 and at least one control unit 130 configured to control said display 110 as a function of said processed data 101. As mentioned above, the present invention can take the form of a precious or synthetic jewel and/or fine jewellery item 300 comprising said at least one smart screen 100. Thus, unlike said at least one smart screen 100, by means of the proposed arrangement, said precious or synthetic jewel and/or fine jewellery item 300 can occasionally display information related to said processed data 101, and when no information is displayed, said precious or synthetic jewel and/or fine jewellery item 300 gives the appearance of an elegant jewel watch 400 or of an elegant piece of jewellery 400 on the wrist, with decorative elements 299.

Said at least one receiver 120 can include at least one radio frequency receiver 120, at least one ultrasonic receiver 120, at least one induction receiver 120, at least one electrical receiver 120 and/or at least one optical receiver 120, such that said at least one receiver 120 receives said processed data 101 either by radio frequency signals, or by ultrasonic signals, or by induction signals, or by current signals, or by voltage signals and/or by light signals.

Once inserted onto said at least one smart wristband 200, said at least one smart screen 100 can slide along said at least one smart wristband 200 via at least one sliding member 140 comprised in said at least one smart wristband 200. It is also possible to provide at least one runner member 140 to allow said at least one smart screen 100 to run along said at least one smart wristband 200 and/or at least one bearing to allow said at least one smart screen 100 to run and/or slide along said at least one smart wristband 200.

As mentioned above, it is possible to provide an assembly of said at least one smart screen 100 comprising at least one smart screen 100 on said at least one smart wristband 200 or on an assembly of said at least one smart wristband 200 comprising at least one smart wristband 200. To this end, a communication method 500 allows said at least one smart wristband 200 to communicate with said at least one smart screen 100. To achieve this, said communication method 500 includes at least one step 510 of indicating the number of said at least one smart wristband 200 in said assembly of said at least one smart wristband 200 and/or of said at least one smart screen 100. Once the number has been indicated, there is at least one step 530 of distributing said data 201 to be processed and/or of said processed data 101 between said at least one smart wristband 200 and/or said at least one smart screen 100, such that a wristwatch 202, i.e. said at least one smart screen 100 with said at least one smart wristband 200 can distribute said data to be processed between said at least one smart wristband(s) 200 and/or said processed data 101 between said at least one smart screen(s) 100. Said processed data 101 can appear as a processed data group 600, which is transferred between said at least one smart wristband(s) 200 and/or between said at least one smart screen(s) 100, and includes at least one address 121 and at least one processed data item so as to facilitate communication between said at least one smart wristband(s) 200 with said at least one smart screen(s) 100.

Thus, said processed data group 600 and/or said processed data 101 is distributed to at least one smart screen 100 or to said assembly of said at least one smart screen 100 which can move on said assembly of said at least one smart wristband 200 or on at least one smart wristband 200. Hence, said processed data group 600 is centralised and/or said processed data 101 are centralised and it or they are distributed across said assembly of said at least one smart screen 100.

A multiplexing algorithm or said communication method 500 is provided to ensure that said processed data 101 are addressed to at least one smart screen 100. Thus, said processed data group 600 can, for example, be structured in three parts. A first part activates at least one smart screen 100 of said assembly of said at least one smart screen 100, a second part includes a data item relating to the time, for example, and the third part indicates the end of said data group 600 and places said assembly of at least one smart screen 100 on standby.

Said at least one processing unit 210, for calculating the time and/or date, is incorporated in said at least one wristband 202.

The invention claimed is:

1. A watch or piece of jewellery comprising a smart wristband and at least a smart screen arranged to be moved and disposed in a given location along the smart wristband, the smart wristband comprising:

a wristband;

a guide included in the wristband and extending along a length of the wristband, the guide being configured to guide processed data along the wristband to said smart screen; and a processing unit configured to transmit, via a second communication interface and the guide for transmission, the processed data to a first communication interface comprising a receiver of said smart screen, said receiver being configured to receive the processed data, the transmission guide being configured to ensure continuous transmission of the processed data by electromagnetic wave, acoustic wave, by electrical signals and/or by optical signals up to the receiver of the smart screen disposed at a given location along the wristband; and the smart screen connected to said smart wristband and comprising:

a display configured to run and/or slide along said smart bracelet; and a control unit configured to control the display as a function of the processed data.

2. The watch or piece of jewellery according to claim 1, said at least a second communication interface is configured to be in contact with at least a first communication interface, with at least one smart screen and/or with at least one precious or synthetic jewel and/or fine jewellery item.

3. The watch or piece of jewellery according to claim 1, wherein said at least one transmission support comprises at least one electromagnetic waveguide, at least one acoustic waveguide, at least one electrical conductor and/or at least one optical fibre.

4. The watch or piece of jewellery according to claim 1, wherein said at least one transmitter comprises at least one radio frequency transmitter, at least one ultrasonic transmitter, at least one induction transmitter, at least one electrical transmitter and/or at least one optical transmitter.

5. The watch or piece of jewellery according to claim 1, wherein said at least one receiver comprises at least one radio frequency receiver, at least one ultrasonic receiver, at least one induction receiver, at least one electrical receiver and/or at least one optical receiver.

6. Communication method for a watch and/or piece of jewellery, comprising:

obtaining a watch or a piece of jewellery according to claim 1;

providing an indication of the number of said at least one smart wristband of said assembly of at least one smart wristband, of said at least one smart screen of said assembly of at least one smart screen, and/or of said at least one precious or synthetic jewel and/or fine jewellery item of said assembly of at least one precious or synthetic jewel and/or fine jewellery item, and making a distribution of said data to be processed and/or said processed data between said assembly of at least one smart wristband, said assembly of at least one smart screen and/or said assembly of at least one precious or synthetic jewel and/or fine jewellery item.

* * * * *